April 25, 1961     E. E. HAYES     2,981,821
ELECTRIC APPLIANCE
Filed Nov. 12, 1957
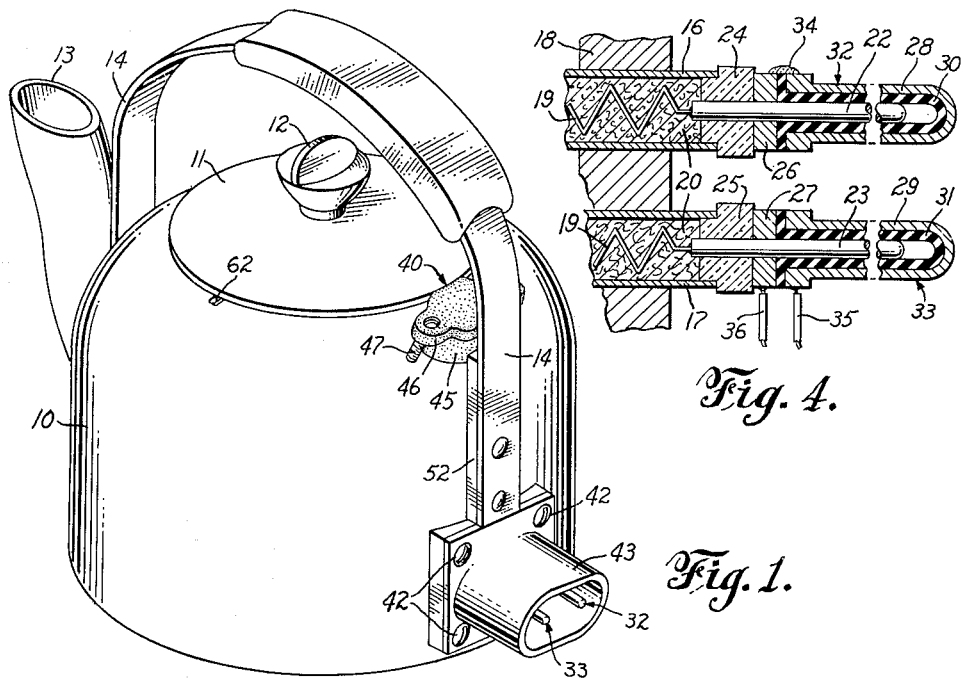
Fig. 4.
Fig. 1.
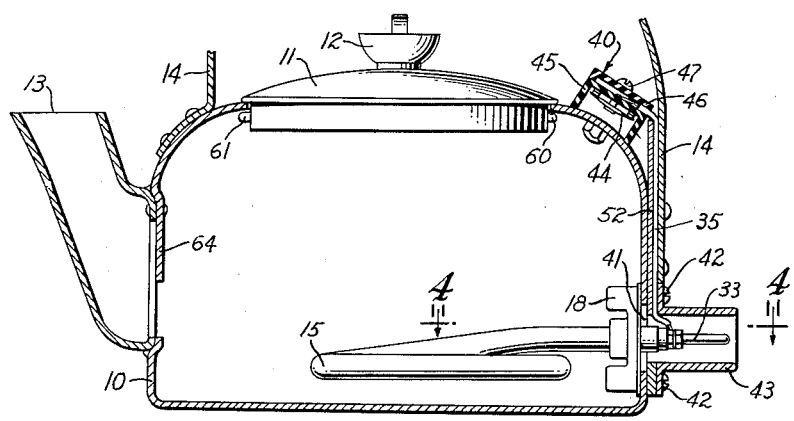
Fig. 2.
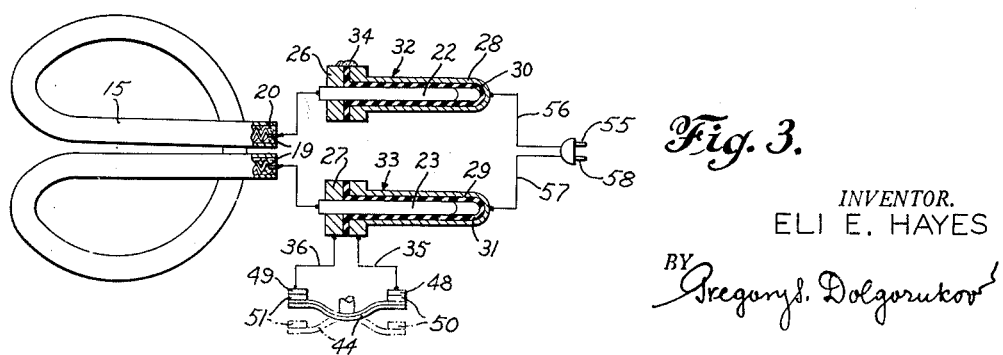
Fig. 3.
INVENTOR.
ELI E. HAYES
BY Gregory S. Dolgorukov

# United States Patent Office 2,981,821
Patented Apr. 25, 1961

2,981,821

ELECTRIC APPLIANCE

Eli E. Hayes, 4827 Three Mile Drive, Detroit 24, Mich.

Filed Nov. 12, 1957, Ser. No. 696,590

3 Claims. (Cl. 219—44)

This invention relates to electric appliances for boiling various liquids and more particularly to an improved electrically heated kettle for boiling water, or "tea kettle." The present application is a continuation-in-part of my copending application, Serial No. 218,408, filed March 30, 1951, for Electric Appliance, now abandoned.

In spite of the constantly increasing use in homes of electric stoves as well as of various other electric household and cooking appliances, the problem of boiling water electrically for tea or general use still remains unsolved. It is well known that an electric stove, while being an efficient and convenient device for general cooking purposes, is very slow and inefficient for heating water. In fact, this particular deficiency of electric stoves is a feature emphasizing the corresponding advantage of gas stoves, and it greatly hampers wider use of electric stoves in homes. Because of the frequent necessity to boil water, large surfaces of kettles from which radiation and convection heat losses take place, as well as the long time required to bring the water to boiling during which period such losses occur, heating water on surface heating elements of an electric stove is not only slow but very costly. In fact, heating water on an electric stove accounts in a large measure for the greater over-all operation expense of the electric stove as compared with a gas stove.

The use of water kettles having heating elements disposed within the kettle, i.e. immersed in the water, has proved much more economical. However, electric kettles have defied so far the efforts of those skilled in the art to incorporate into them a very important improvement specified below, the necessity of which is becoming more and more keenly felt in a modern kitchen.

Since the water for tea or other uses may be needed any time during the day and outside of the regular cooking hours when no one usually remains in the kitchen, and since the electric stove is quiet in operation, tea kettles are often forgotten after being placed on the stove and are left boiling until someone recalls that the tea kettle is on or happens to walk into the kitchen. Signal devices such as steam operated whistles have proved to be rather annoying, and their use is limited. Therefore, the need for a tea kettle with thermostatically operated switch has been keenly felt both for independent use and for use in connection with electric stoves. However, while incorporation of a thermostat switch into a conventional water heater does not present any particular difficulties, attempts toward incorporation of such a switch into a tea kettle have not yet proved fully successful.

It can be easily appreciated that in case of a basement water heater with a thermostat adapted to break the circuit, say at 180° F., and to close the circuit at 150° F., it makes little difference if the thermostat would actually open and close the circuit at temperatures differing by a few degrees from the predetermined temperatures. The situation is entirely different in the case where not merely heating but boiling of the water is required. In the first place, it is impractical to require for a tea kettle a thermostat insuring precision operation throughout its life with mistake not over a portion of a degree. Mistake of several degrees must be considered as permissible for commercial thermostats. Furthermore, the temperature of boiling of water is not constant but varies within a considerable range. While at barometric pressure of 30" Hg and 0 altitude it is 212° F., should atmospheric pressure drop to 29" Hg, the water will boil at approximately 210° F. at 1500 feet elevation. Therefore, even with a precision thermostat set to break the current at 212° F., should barometric pressure drop, the tea kettle will boil out without operating such thermostat. On the other hand, if the thermostat is set to break the current at, say, approximately 208° F., then it will not permit the water to come to boiling under many conditions. It is well known, of course, that boiling water remains at the same temperature if pressure remains unchanged. It is equally well known that a tea kettle in which the water cannot come to actual boiling is impractical.

In view of the above, thermostats have not heretofore been included into tea kettles, and the devices that may be found in some kettles and termed thermostats are merely safety switches intended to break the electric circuit when the water is boiled out and the tea kettle gets dangerously hot.

One of the objects of the present invention is to provide an improved tea kettle whereby the above difficulties and disadvantages are overcome and largely eliminated.

Another object of the present invention is to provide an improved electric tea kettle which can be used selectively either as a common tea kettle in which the contents are heated due to the bottom of the tea kettle being in direct contact at its outside surface with a hot body such as a gas or electric burner, or as an "electric tea kettle" in which the contents are heated from the inside thereof with the aid of electric heating means.

Still another object of the present invention is to provide an improved electric tea kettle in which the entire mass of the water is brought to full boiling, and is actually boiled for a period of time sufficient to bring the entire mass of water to full boiling before the electric current is automatically switched off, and in which such operation of the tea kettle is not affected by changes in the boiling temperature of water due to changes in practically occurring barometric pressure or elevation.

A further object of the present inevntion is to provide an improved electric tea kettle having means whereby the water therein is brought to actual boiling and thereupon is automatically maintained near boiling, with electric current being automatically switched on to bring water to boiling again as soon as it cools only a few degrees below its boiling temperature.

A still further object of the present invention is to provide an improved electric tea kettle which gives hot water constantly for tea, coffee, or general kitchen use and is very economical to operate.

A still further object of the present invention is to provide an improved electric tea kettle of the foregoing nature, which is quiet in operation and needs no whistles or other signal devices, does not steam the kitchen and does not lose water by undersirable evaporation.

It is an added object of the present invention to provide an improved electric tea kettle of the foregoing nature which is simple and rugged in construction, safe and dependable in operation and is relatively inexpensive to manufacture.

Further objects and advantages of the invention will be apparent from the following description, taken in connection with the appended drawings, in which:

Fig. 1 is a perspective view of an electric tea kettle embodying the present invention.

Fig. 2 is a vertical sectional view of the tea kettle of Fig. 1.

Fig. 3 is an electrical diagram of the tea kettle.

Fig. 4 is a fragmentary sectional view taken on the section plane passing through the line 4—4 of Fig. 2.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In accordance with the invention, I provide an improved electric tea kettle, particularly adapted for boiling water, which is constructed in such a manner that it may be used either as a common kettle and be heated from the outside on an electric or gas stove, or be used as an automatically controlled electric tea kettle by being plugged in to an electric outlet and with its contents being heated electrically from the inside of the kettle. Accordingly, the construction of my improved kettle is such that it has a receptacle having a bottom consisting of a solid metal without any perforations or attachments and, therefore, suitable for being in direct contact with a hot body. It should be understood, however, that for improving conductivity of the bottom the same may actually consist of more than a single layer of metal and, therefore, the term "a single layer of metal" when used herein is to be understood as meaning a certain thickness of solid metal consisting of one or several layers but forming, in effect, a unitary thickness of metal.

Moreover, the construction of the kettle is such that it responds to boiling rather than to temperature, and, therefore, as soon as its contents are brought to boiling, the electric heating element thereof will be switched off in spite of the fact that the actual temperature of boiling depending on elevation and other factors affecting atmospheric pressure may vary and cause a substantial difference in the boiling temperature. In other words, in my improved tea kettle the control of electric heating means is not purely thermostatic in its function but is so modified that it will operate to switch the heating element off at various temperatures. I attain such an object by constructing my controls in such a manner that the controlling element while including a thermostatic element is actuated by the heat of the steam rather than by heat of the liquid. In other words, unless the water actually boils, the heating element will not respond in spite of the fact that the water may be at a temperature which by itself would be sufficient to actuate the electric heating element. In addition, my controls are such that while the thermostatic element is controlled by the heat of the steam, as the kettle begins to boil, no actual contact of the steam with the thermostatic element occurs and its heating is effected by the action of conduction and radiation only. This is an important safety feature making such control practical and safe.

In accordance with the invention, in construction an electric appliance of this general nature I provide a receptacle for the liquid contents thereof and arrange at the bottom of the receptacle electric heating means. I also provide a thermostat switch means to control said heating means automatically. The thermostat switch means are arranged preferably on the receptacle but at a place distant from the liquid in order to insure that conduction of the heat from the water only is not capable to heat the thermostat to its tripping temperature (or above a predetermined temperature well below boiling temperature) under any practical barometric pressure. However, the thermostat is so arranged that when the liquid boils and the steam fills the entire receptacle, the thermostat is heated within a short period of time, such as 2 or 3 minutes to a temperature well above its tripping off temperature, which temperature, however, may be as low as 190° F. Because of such a location, the thermostat cools after tripping much faster than the contents of the liquid. For instance, by the time the liquid cools down 3° F., the thermostat cools down 30° F., and reaches its tripping on temperature of 160° F. By virtue of such a construction, the thermostat will not break the current until the liquid is brought to actual boiling, no matter what the boiling temperature may be under the particular barometric pressure conditions. The only effect of the change of barometric pressure is on the period of boiling, the same becoming longer if the barometric pressure drops and the water boils at a lower temperature, since it takes more time to heat the thermostat to tripping. After boiling, as soon as the liquid cools down several degrees, the thermostat, which by that time cooled down to a much lower temperature, closes the circuit, and the heating means bring the water to boiling again.

The heating effect of the electric current passing through the thermostat is also important and may be utilized. It can be easily appreciated that thermostat element is heated when the current passes through it, and that it loses the heat so acquired very rapidly upon breaking of the current. The latter condition contributes still further to the thermostat cooling faster than the water.

This heating effect of current flow through the thermostat disc may be further augmented by installing a heater strip in series with the thermostat disc and above it. During the time that the tea kettle is cycling on and off to keep the water within a few degrees of boiling, the majority of the heat required to trip the thermostat may be furnished by the effect of the current passing through the disc heating its small mass very quickly. This prevents excessive boiling from occurring when the control is used to keep the water warm until called for.

Referring specifically to the drawings, the electric appliances illustrated therein by way of example is a kettle for boiling water. The kettles of this general nature are commonly called tea kettles. It will be understood, however, that while the present invention is herein illustrated and described with reference to a tea kettle, it can be applied with success to other electric appliances where bringing liquid to boiling and maintaining it near boiling temperature is desired.

The tea kettle illustrated in the drawings comprises a body or receptacle 10 of any suitable shape, made of suitable material, preferably of sheet aluminum for the reasons explained below. On the top of the receptacle 10 there is provided a lid 11 having a knob 12. A pouring spout 13 is provided in a manner well known in the art. A handle 14 is provided and may be of any suitable type.

Electric heating means comprise a heating element of the immersion type having a bent metal tube 15 made of suitable material and having its ends 16 and 17 secured in a frame piece 18. The tube 15 houses resistant heating wire 19 electrically insulated from the tube with heat conducting packing 20 of magnesium oxide (MnO) or other suitable material. The ends of the resistance heating wire 19 are connected to prong core pieces 22 and 23 passing through porcelain washers 24 and 25 held in the ends 16 and 17 of the tube 15 (see Fig. 3). The core pieces 22 and 23 have provided thereon and electrically connected thereto metal washers 26 and 27; prong shells 28 and 29 are fitted over the core pieces 22 and 23 but are electrically insulated therefrom with the aid of sleeves 30 and 31 made of a suitable material such as glass fabric tubes.

It will now be understood in view of the foregoing that core pieces 22 and 23 are electrically connected to the resistance heating wire 19, but are electrically insulated from their respective prong shells 28 and 29. Therefore, with the construction so far described, plugging the prongs generally designated by the numerals 32 and 33 into the circuit will not cause flow of the current therethrough and heating of the element, unless electric connection between the prong shells and the prong cores is first established.

In the prong 32 in the electric connection between the core 22 and the shell 20 is effected with the aid of a piece of solder 34 melting at approximately 250° F. By virtue of such a connection in the normal operation of the tea kettle, there is a constant electrical connection between the prong and the heating wire. However, should the temperature of the tea kettle in the vicinity of the prong 32 rise above probable boiling temperature of water, the solder piece 34 melts and the electric current is automatically switched off. Providing a new solder connection after one is melted is very simple in my construction and does not require disassembling of the heating element. Also, presence of the solder or its absence can be easily ascertained by outside examination of the prong.

In the prong 33 the electric connection between the prong shell 29 and washer 27 is provided with the aid of wires 35 and 36 connected to a thermostat switch 40 adapted to control such connection, in a manner described below.

The heating element is secured to the receptacle 10 near the bottom thereof by having the frame piece 18 secured to the receptable at an aperture 41 with the aid of screws 42, or other suitable connectors, holding to the receptacle also the prongs housing 43.

It is an important feature of the present invention that the thermostat switch responds or senses, in effect, the fact of boiling of the water, i.e. generation of steam, rather than to the temperature of water. Such operation of the thermostat is insured by arranging it at a point on the receptacle as far removed from the water as practical. In the present embodiment, the thermostat switch is arranged at the top of the receptacle 10.

The thermostat switch generally designated by the numeral 40, comprises a disc-shaped bi-metallic element 44 formed to a convex or saucer-like shape and mounted within an insulating cartridge or housing 45 connected to the receptacle 10 with the aid of an insulating plate 46 secured to the receptacle wall with the aid of bolts 47. The insulated wires 35 and 36 are connected to the contacts 48 and 49 adapted to be in contact with contacts 50 and 51 carried by the disc 44. The wires 35 and 36 are housed within a channel piece 52 arranged between the receptacle wall and the handle 14, see Figs. 1 and 2. A heater strip may be incorporated above the thermostat disc and connected in series with the thermostat disc to increase its sensitivity.

It will be understood that considerable amount of built-in regulation of my control element may be attained by changing material and construction of the insulating plate 46 or an equivalent thereof, or a cover. While for the purposes above explained said insulating plate 46 means "electrically insulating," it may also be made of heat insulating material in order to increase the heating capacity of the device by preventing dissipation of heat. This feature may be enhanced still further by providing a reflecting surface on the bottom of such plate, such as aluminum foil. However, it may be desired under certain conditions to make such plate heat-conducting in order to decrease the heating capacity of the means. Such decrease may be enhanced still further by providing cooling fins on the outer surface of such metal plate. By proper selection of the desired expedient between the above indicated extremes, very desirable and close control may be built in and attained.

With the tea kettle filled with water and the prongs 32 and 33 of it connected to an electric line with the aid of a conventional extension cord, the current flows and heats the tube 15 and the water. Referring to Fig. 3, flow of the current in the tea kettle may be easily traced. From the prong 55 of an extension cord the line current flows through the wire 56 of the cord to the shell 28 of the tea kettle prong 32, solder 34, metal washer 26 to the resistance heating wire 19 heating the tube 15. From the wire 19 the current flows through the washer 27, wire 36, contacts 49 and 51, bi-metallic disc 44, contacts 50 and 48, wire 35, shell 29 of the prong 33, and through the wire 57 and prong 58 of the extension cord back into the line.

Since the thermostat element 44 is removed from the water and from the metal of the receptacle 10, it will remain at a much lower temperature than the water. I prefer to mount the thermostat element 44 selecting and experimentally checking the factors controlling heat transfer thereto in such a manner that the temperature of the element 44 is kept approximately 40° F. lower than that of the water approaching boiling. The main factors affecting heat transfer are: material of the receptacle 10 and finish of its inner surfaces; distance of the element 44 from the water level and from the outer surface of the receptacle; heat conductivity of the element housing and mounting; and, electrical resistance of the element 44 as determining its heating by electric current. Aluminum receptacle with shiny inner surfaces tends to retain heat within the receptacle; height of the housing 45 of the element 44 is a very convenient and effective way of producing the desired temperature difference between the water and the element 44, and controlling the period of time required to bring the element 44 to tipping off temperature after the water boils.

As the water begins to boil, the steam expels the air filling the space above the water level and by its direct contact with the top of the receptacle and scrubbing action thereon quickly heats the receptacle wall under the element 44 to the boiling temperature of the water. After 2 or 3 minutes of boiling, the temperature of the element 44 rises from approximately 170° F. to approximately 190° F., which is the tripping off temperature for the element 44. With the element of the convex shape, the tripping is momentary and definite. Upon reaching the tripping temperature, the disc snaps into concave shape with a light cracking noise, separating the contacts 49 and 51 as well as 48 and 50, and interrupts the current. Thereupon generation of the steam ceases after approximately 10 to 15 seconds. The water is now ready for use. Irrespective of the fact whether or not some water was used or not, as long as there is water in the tea kettle it may be left plugged in continuously.

After the water was brought to boiling and the current automatically switched off, cooling of the tea kettle and water begins immediately. The top of the receptacle and the thermostat element 44 cool much more rapidly than the water. After the top of the receptacle cools 2°–3° F., the steam above the water condenses, and cool air rushes in to occupy the vacuum thus created. In approximately 5–7 minutes the temperature of the top of the receptacle drops to approximately 200° F., and the temperature of the water to 2°–3° F. below its boiling point. By this time the temperature of the element 44 drops to its tripping on temperature of 160° F. The thermostat trips and closes the current. The water is again brought to boiling and the current switched off again.

By actual tests I have found that my tea kettle may be left plugged in all day. It automatically switches itself on every 5–7 minutes for approximately a minute or a little less, bringing the water to boil as soon as its temperature drops a few degrees. Thus, a constant supply of boiling water is made available for any desired purpose.

Practically occurring variations in the barometric pressure or temperature of the kitchen have little effect on operation of my kettle. This effect manifests itself only in the time during which the water actually boils, and the frequency of switching on of the current. The lower the barometric pressure and the lower the temperature of the kitchen (ambient temperature), the more time it takes to heat the element 44 to tripping temperature. Therefore, the period of actual boiling of the water will be longer.

Means are provided to prevent excessive or sudden spilling of the entire contents of the tea kettle should it be accidentally overturned. Said means comprise protrusions 60 and 61 on the lid parallel cooperating with a notch 62 on the edge of the receptacle at the lid aperture. By virtue of such a construction the lid may be put in place and removed only when one of the protrusions register with the notch 62. Thus, when the lid is put in place (by first putting one protrusion under the kettle edge and passing the other through the notch 62) and turned through some angle, such as 90°, falling of the kettle on the floor will not cause opening of the lid. It will be understood, however, that the lid fits somewhat loosely to permit steam to escape. Means are also provided to prevent excessive pouring of hot water through the spout in case of an accident. Said means are exemplified by the safety baffle 64 provided at the receiving aperture of the spout 13 and continuing downwardly to approximately half of the receptacle height. By virtue of such a construction communication between the receptacle and spout is limited to the lower portion of the spout opening.

It should be also appreciated that construction of my improved prongs 32 and 33 greatly simplifies the design of the tea kettle and the wiring thereof. Such prongs may be used with success in a great number of electric appliances.

While the present invention has been illustrated and described with respect to an article commonly known as a "tea kettle," it will be understood that the invention is applicable with equal success to devices in which water is brought to boiling for other purposes, such as for sterilizing medical instruments and the like. Moreover, instead of water, a device embodying the present invention may be constructed to bring to a boil liquids other than water for any desired purpose.

By virtue of the construction described above, the objects of the invention listed above and numerous additional requirements are attained.

I claim:

1. In an electric appliance adapted to bring liquids to a boil selectively by direct contact with a source of heat from the outside and by an electrically heated element from the inside, and to maintain the liquid brought to boiling substantially at boiling temperature, a liquid receptacle having walls and a bottom, said bottom consisting of a solid thickness of material free of any attachments and perforations and adapted, when in contact with an outside source of heat, to heat the liquid contents of the kettle; an electric circuit including interposed therein an electric immersion means disposed adjacent the bottom but separated therefrom by a layer of liquid, a thermostat switch means being arranged on the wall of said liquid receptacle at a substantial distance above the liquid level and also outside of the receptacle in order to make it non-responsive directly to the temperature of the liquid, said thermostat switch means including a heat responsive element arranged in close proximity to the wall of said receptacle and in heat transfer relation thereto and adapted to carry electric current and thus to constitute, when closed, a part of said electric circuit and, therefore, to be resistance heated in the process of carrying the current and to be heated further by radiation and conduction heat from the wall of the receptacle when said wall is heated by the steam of the liquid brought to boil, but without the steam coming in actual contact with said heat sensitive element, to break said circuit, and to close said circuit when boiling stops and the liquid cools down to a predetermined lower temperature.

2. An electric tea kettle adapted to be used selectively as a common kettle heated from the outside, such as on a stove burner, and as a kettle heated electrically from the inside, said kettle comprising a receptacle for water with said receptacle having a solid metal bottom adapted to have water on one of its sides and to be in direct contact with a hot body on its other side; an electric circuit including an electric immersion heating element disposed near the bottom of said receptacle but separated therefrom by a layer of water and with its terminals located on the side of the receptacle and outside thereof; and a thermostat switch operatively interposed within said circuit to make and break the same and arranged near the top of said receptacle at a substantial distance above the water level but outside of the receptacle, said thermostat switch being non-responsive to the temperature of water but adapted to break the circuit when heated by conduction and radiation by the heat imparted by the steam of the boiling water to the receptacle wall, and to close the circuit when the water cools down to a predetermined temperature, said thermostat being shielded from direct contact with the steam and including a heat sensitive element adapted to carry the electric current and to be resistance heated thereby and arranged in close proximity to the wall of said receptacle and in heat transfer relation thereto.

3. An electric tea kettle adapted to be used selectively as a common kettle heated from the outside as on a stove burner and as a kettle heated electrically from the inside, said kettle comprising a receptacle having walls and a bottom with said bottom consisting of a solid layer of metal free of any attachments and preforations and adapted, when in contact with an outside source of heat, to heat water in the kettle; an electric circuit including an electric immersion heating element arranged near the bottom of the receptacle but separated therefrom by a layer of water, a thermostat operatively interposed into said circuit to make and break the same and arranged near the top of said receptacle on the outside thereof and at a substantial distance above the water level and in close proximity to the wall of the receptacle and in heat transfer relation thereto but out of direct contact with the steam when the kettle boils, said thermostat being adapted to carry the current and to be resistance heated thereby and to be heated also by the steam heat transferred thereto from the receptacle wall, said thermostat being adapted to break the circuit when heated to approximately 190° F. and to close the circuit when cooled below approximately 160° F.

References Cited in the file of this patent

UNITED STATES PATENTS

| | | |
|---|---|---|
| 1,417,649 | Williams et al. | May 30, 1922 |
| 1,676,923 | Phelan et al. | July 10, 1928 |
| 1,839,329 | Murphy | Jan. 5, 1932 |
| 2,018,695 | Wilcox | Oct. 29, 1935 |
| 2,022,531 | Adams | Nov. 26, 1935 |
| 2,061,536 | Dillman | Nov. 17, 1936 |
| 2,168,158 | Hall | Aug. 1, 1939 |
| 2,266,090 | Smith | Dec. 16, 1941 |
| 2,392,635 | Bletz | Jan. 8, 1946 |
| 2,489,560 | Brown | Nov. 29, 1949 |
| 2,490,103 | Stilwell | Dec. 6, 1949 |
| 2,509,008 | McFarland | May 23, 1950 |
| 2,528,191 | Turner | Oct. 31, 1950 |
| 2,651,707 | Jepson | Sept. 8, 1953 |

FOREIGN PATENTS

| | | |
|---|---|---|
| 598,032 | Great Britain | Feb. 9, 1948 |